W. G. SANDFORD.
PORTABLE VULCANIZER.
APPLICATION FILED SEPT. 20, 1913.
1,161,414.
Patented Nov. 23, 1915.
2 SHEETS—SHEET 1.
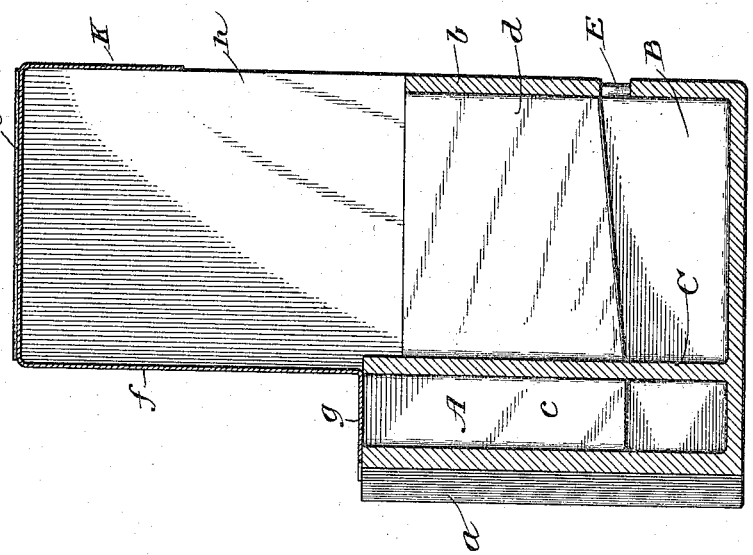
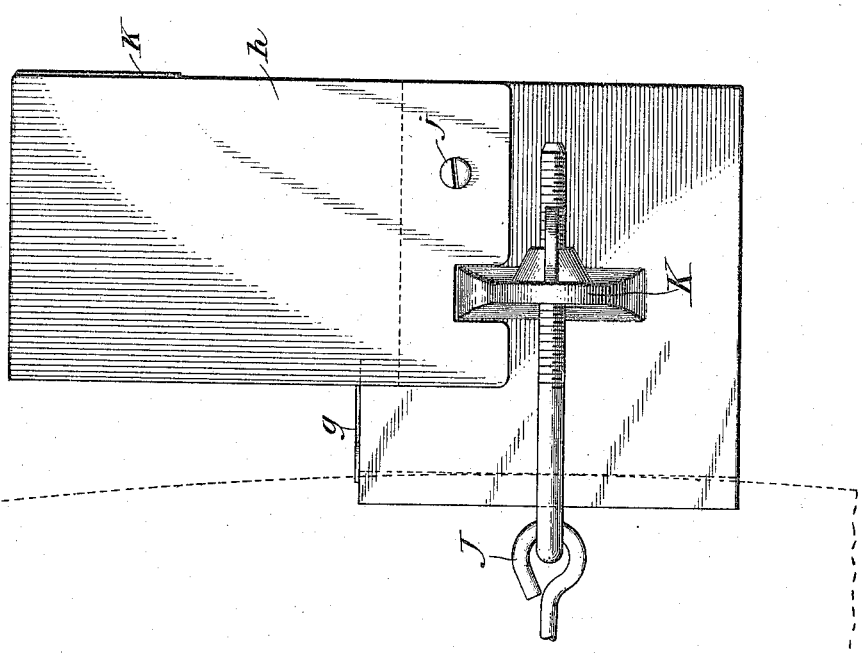

W. G. SANDFORD.
PORTABLE VULCANIZER.
APPLICATION FILED SEPT. 20, 1913.
1,161,414.
Patented Nov. 23, 1915.
2 SHEETS—SHEET 2.
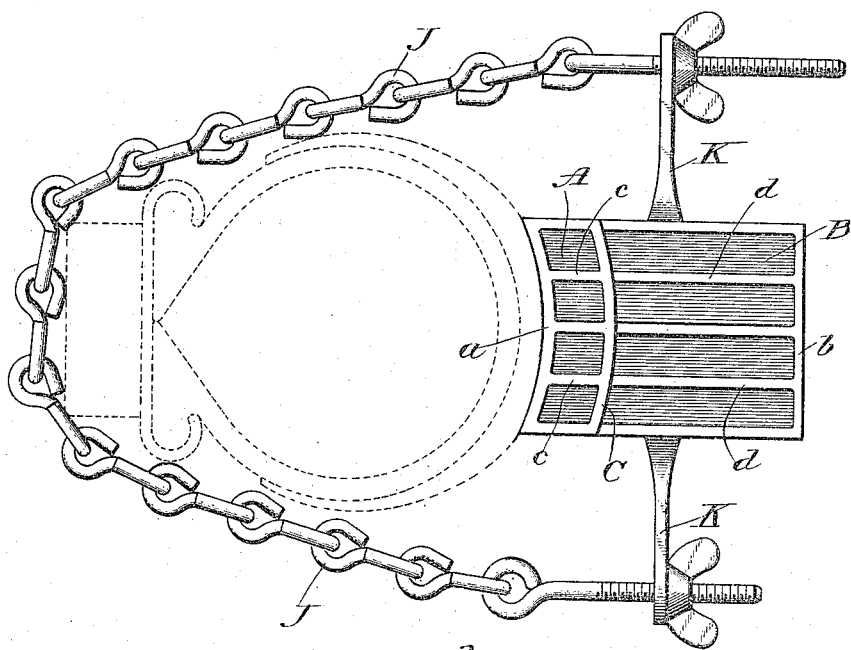
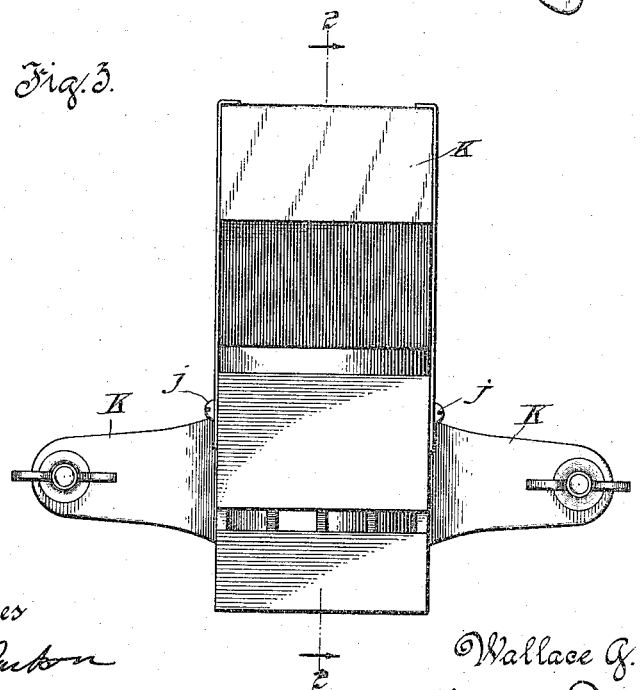
Witnesses
Arthur W. Carlson
Robert H. Weir
Inventor
Wallace G. Sandford
By Frank D. Thomason
Atty.

UNITED STATES PATENT OFFICE.

WALLACE G. SANDFORD, OF DAVENPORT, IOWA, ASSIGNOR TO POSITIVE TIRE VULCANIZER COMPANY, OF DAVENPORT, IOWA, A CORPORATION OF IOWA.

PORTABLE VULCANIZER.

1,161,414.     Specification of Letters Patent.     Patented Nov. 23, 1915.

Application filed September 20, 1913. Serial No. 790,822.

*To all whom it may concern:*

Be it known that I, WALLACE G. SANDFORD, a citizen of the United States, residing at Davenport, in the county of Scott and State of Iowa, have invented new and useful Improvements in Portable Vulcanizers, of which the following is a full, clear, and exact description.

My invention relates to vulcanizers, and particularly portable vulcanizers for repairing inflated tires for vehicles, such as illustrated and described in the pending application of James Scott Benson, filed in the United States Patent Office, November 14th, 1913, Serial No. 733,384. Experience has shown that the flames generated in the combustion compartment of the said vulcanizer flicker and act in a very erratic manner when the burning gases thrown off by the heated combustible fluid have to depend upon the air at the top of the compartment for the necessary oxygen to produce combustion, and also show that these flickering flames are apt to drift toward and against the tire above the vulcanizer, particularly when air is combined with said burning gases at a suitable point in the combustion compartment below the top of the vulcanizer.

The objects of my improvements are to promote the combustion of the gasolene or other combustible fluid in the combustion compartment below the top of the same so as to more effectively and quickly heat the water in the adjoining compartment, and to provide means for preventing the flames from coming in contact with the tire. This I accomplish by the means hereinafter fully described and as particularly pointed out in the claims.

In the drawings: Figure 1 is a side view of my improved vulcanizer. Fig. 2 is a vertical section therethrough. Fig. 3 is a front elevation, and Fig. 4 is a plan view of the vulcanizer with the hood removed.

In the drawings, the body of the vulcanizer with which my improvements are identified, is of a rectangular box shape, except as hereinafter explained, and contains a water compartment A next the vertical side or vulcanizing-plate *a*, and a combustion-compartment B which is separated from the water compartment by a vertical partition C, that is substantially parallel to the vulcanizing plate. In order to use this vulcanizer, the vulcanizing-plate thereof is placed against the injured portion of the tread of the inflatable tire it is desired to repair, and the contacting outer surface of said plate is, preferably, concaved to conform to the tread of the tire. The vulcanizing-plate and the partition C are both slightly higher than the opposite parallel wall *b* of the combustion-chamber, and the side walls of the vulcanizer connect them all the way up, thus making the water compartment of greater depth than the combustion chamber, and said partition is, preferably, much nearer the vulcanizing-plate than said opposite wall *b*, thus making the water compartment narrower than the combustion compartment and reduces the width of the aqueous medium therein which separates said compartment from the vulcanizing plate and limits the amount of heat transmitted to said plate. The water compartment is, preferably, divided into a series of vertical cells by equi-distant division-walls, *c*, *c*, that connect the vulcanizing-plate and partition and have their lower edges terminate above the bottom of the compartment so that said cells may communicate with one another.

The cubical dimensions of the combustion compartment are, preferably, larger than those of the water compartment, and it is also divided into a series of chambers or flues by equi-distant parallel division walls *d*, *d*, that connect partition C and the outer wall *b* of the vulcanizer, and that, preferably, aline with division-walls *c*, *c*, or not, according as desired.

The lower edges of these division-walls *d*, *d*, are, preferably, inclined from their ends connected to the outer wall *b* downward to where they connect with said partition. The said outer wall *b* is provided with a horizontal slot E just below the contiguous lower edges of division-walls *d*, *d*, which, preferably, extends from side to side of the vulcanizer. This slot performs the manifold function of, first, an overflow to prevent too much gasolene being poured into and retained in the combustion compartment, and, second, means for permitting the ingress of air into said compartment, at a point just above the gasolene, so as to provide the necessary oxygen to promote combustion below the top of the combustion compartment, and so as to generate heat and transmit the same to the parts of the integral members of the vulcanizer to a greater extent than would be possible if the flames were generated higher up.

The flames or products of combustion issuing from the top of the combustion chamber are liable to be blown by the air currents against the tire above the water-chamber, and injure the same, and this tendency is increased by the presence of slot E. I have, therefore, provided a hood for the body of the vulcanizer that loosely closes the top of the water compartment and forms a chamber above the gasolene compartment from which the spent products of combustion are discharged from the side opposite or farthest from the tread of the tire.

This hood is, preferably, made of sheet metal and is also of rectangular dimension. It comprises four vertical walls, the upper ends of which are united by a substantially square top e of slightly greater area than the horizontal dimensions of the portion of the body of the vulcanizer devoted to the combustion compartment. The vertical wall f of this hood coming nearest the tread of the tire and disposed in the same general vertical plane as the partition C below it, is of substantially the same height as the side walls of the combustion chamber, and has its lower horizontal edge g flanged toward the vulcanizing-plate, and seated upon and loosely closing the top of the water compartment. The two vertical side-walls h, h, of the hood correspond, and extend downward below the flanged lower edge g of wall f, and lap down past the upper portion of the side-walls of the combustion chamber. The wall k of this hood opposite wall f is a drop-wall and extends down from the top thereof but a short distance and leaves a considerable opening between its lower edge and the top of the combustion chamber from which the products of combustion therefrom are discharged at such a distance from the tire as to eliminate all possibility of injury to the same.

The vulcanizer is secured to the rim of the wheel by means of lugs K, K, projecting laterally from the side-walls of the combustion chamber thereof and chains J, J, in substantially the manner shown in the aforesaid pending application for Letters Patent.

The hood is suitably secured to and mounted upon the body of the vulcanizer by screws j, j, or otherwise, and where lugs K, K, interfere with the lower edges of the side-walls of said hood they are recessed or cut away. This hood, however, is preferably, removably attached to said body, as the latter may, subject to the conditions hereinbefore explained, be used without it, although I prefer its use.

After the puncture in the tire or in the inner tube thereof has been cleansed and treated in the usual manner, and one or more strips of cleansed rubber placed over the puncture, my improved vulcanizer is applied thereto in such manner that the vulcanizing-plate binds the rubber strip or strips in place and the water compartment will be in vertical position. The hood is then tilted away from the tire, moving on the screws j, j, as pivot, sufficiently to expose the top of the body of the vulcanizer. Water is then poured into the water compartment and then the gasolene poured into the combustion chamber in sufficient quantity not to flow out of the slot. The hood is then tilted back in place and the gasolene ignited. The gasolene is permitted to burn itself out, and while doing this the apparatus is left to itself to heat the vulcanizing-plate and soften the rubber, which expands, when heated sufficiently, and is forced into and adheres to the walls of the puncture and to the tread of the tire, and, when properly done, effectually closes the puncture.

What I claim as new is:

1. A portable vulcanizer comprising a suitable body containing a water compartment next the outer vertical vulcanizing-wall thereof, and a gasolene compartment separated from said water compartment by a vertical partition, and a hood or cover tiltably mounted on said body above said gasolene compartment and provided with an opening in the side wall opposite said vulcanizing-wall.

2. A portable vulcanizer comprising a suitable body containing a water compartment next the outer vertical vulcanizing-wall thereof, and a gasolene compartment separated from said water compartment by a vertical partition, and a hood or cover mounted on said body that closes said water compartment and above said gasolene compartment is provided with an opening in the side wall opposite said vulcanizing-wall.

3. A portable vulcanizer comprising a suitable body containing a water compartment next the outer vertical vulcanizing-wall thereof, and a gasolene compartment separated from said water compartment by a vertical partition, and a detachable sheet metal hood mounted on said body above said gasolene compartment and provided with an opening in the side wall opposite said vulcanizing-wall.

4. A portable vulcanizer comprising a suitable body containing a water compartment next the vertical wall thereof constituting the vulcanizing member, and a gasolene compartment separated from the water compartment by a vertical partition, and a detachable box-shaped sheet metal hood mounted upon said vulcanizer; said hood having the lower edge of one of the vertical walls thereof flanged toward said vulcanizing member and covering said water compartment and having the vertical walls thereof at right angles thereto extend to and supported by said vulcanizer, and the wall thereof opposite said flanged wall terminating at a short distance below the closed top of the hood.

5. A portable vulcanizer comprising a suitable body containing a water compartment next the vertical vulcanizing-wall thereof, and a gasolene compartment separated from said water compartment by a vertical partition wall and provided with a slot in the outer wall thereof opposite said vulcanizing wall, in combination with a hood or cover mounted upon said body above said gasolene compartment and provided with an opening in its vertical side opposite said vulcanizing wall from which alone the products of combustion are discharged.

In witness whereof I have hereunto set my hand this 16th day of September, 1913.

WALLACE G. SANDFORD.

Witnesses:
C. M. SEVERIN,
W. T. WATERMAN.

Copies of this patent may be obtained for five cents each, by addressing the "Commissioner of Patents, Washington, D. C."